US011153824B1

(12) United States Patent
Jia et al.

(10) Patent No.: US 11,153,824 B1
(45) Date of Patent: Oct. 19, 2021

(54) MAINTENANCE AND MONITORING OF TARGET WAIT TIME (TWT) SESSIONS

(71) Applicant: Hewlett Packard Enterprise Development LP, Houston, TX (US)

(72) Inventors: Xuguang Jia, Beijing (CN); Qiang Zhou, Santa Clara, CA (US); Guangzhi Ran, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/010,303

(22) Filed: Sep. 2, 2020

(51) Int. Cl.
*H04W 52/02* (2009.01)
*H04L 1/16* (2006.01)

(52) U.S. Cl.
CPC ....... *H04W 52/0229* (2013.01); *H04L 1/1621* (2013.01); *H04W 52/0216* (2013.01); *H04W 52/0258* (2013.01)

(58) Field of Classification Search
CPC ......... H04W 52/0229; H04W 52/0216; H04W 52/0258; H04L 1/1621
See application file for complete search history.

(56) References Cited

U.S. PATENT DOCUMENTS

| 10,542,071 | B1* | 1/2020 | Matthews | ........... H04L 67/1014 |
| 10,791,516 | B1* | 9/2020 | Chu | .................. H04W 72/0446 |
| 11,032,180 | B2* | 6/2021 | Shih | ..................... G06F 11/3495 |
| 2007/0006288 | A1* | 1/2007 | Mayfield | ............. H04W 12/128 726/5 |
| 2007/0016679 | A1* | 1/2007 | Mayfield | ............... H04L 69/327 709/227 |
| 2020/0044950 | A1* | 2/2020 | Shih | ...................... G06F 16/951 |
| 2021/0068008 | A1* | 3/2021 | Asterjadhi | ........ H04W 72/0446 |

* cited by examiner

*Primary Examiner* — Dominic E Rego
(74) *Attorney, Agent, or Firm* — Jaffery Watson Mendonsa & Hamilton

(57) ABSTRACT

Maintenance and monitoring of target wait time (TWT) sessions is described. An example includes establishing at least a first target wake time (TWT) session for a first station, the first TWT session having a first set of parameters defining a wake time, wake duration, and wake interval for service periods of the first TWT session; selecting the first TWT session for health status determination; selecting a check window for the health status determination and monitoring transmissions from the first station within the check window; based at least in part on the monitoring of the transmissions from the first station, calculating a first TWT session health status value for the first TWT session; and determining whether corrective action is required for the first TWT session based at least in part on the first TWT session health status value.

20 Claims, 10 Drawing Sheets

MAINTENANCE AND MONITORING OF TARGET WAIT TIME (TWT) SESSIONS

BACKGROUND

In Wi-Fi operation under the IEEE 802.11ax standard (also referred to as Wi-Fi 6) and following IEEE 802.11 standards, target wake time (TWT) is a power saving mechanism that can be utilized to increase the amount of time that an apparatus can remain in a low power state during operation in, for example, wireless local area network (WLAN) communications. TWT allows an access point (AP) and stations to wake up at negotiated times, with each station and the AP to establish a TWT agreement that defines when a station is to be awake to send and receive data. Stated in another way, the AP and one or more stations (STAs) are to negotiate a specific time or a set of times for the stations to access a medium.

More specifically, a TWT session can be used to control the amount of contention over the medium by allowing the station to set up a periodic active/sleep (power save) schedule with the access point. Using the TWT scheme, the station does not need to send explicit power save and active transition notifications to the access point. The use of the TWT scheme allows the station to transition between an active mode and a sleep mode in a responsive manner, improving power consumption and latency. There are various ways for the AP and the STA to engage and arrive at different working types of TWT, such as by individual, broadcast, solicited, unsolicited, announced, and unannounced TWT.

However, the health of a TWT session may decline over time for varying reasons. In particular, the access point may experience a time shift or drift over time that creates a mismatch with a connected device. Such a timing issue may result in wasted power or an operational failure, thus limiting or defeating the purpose of the TWT technology.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
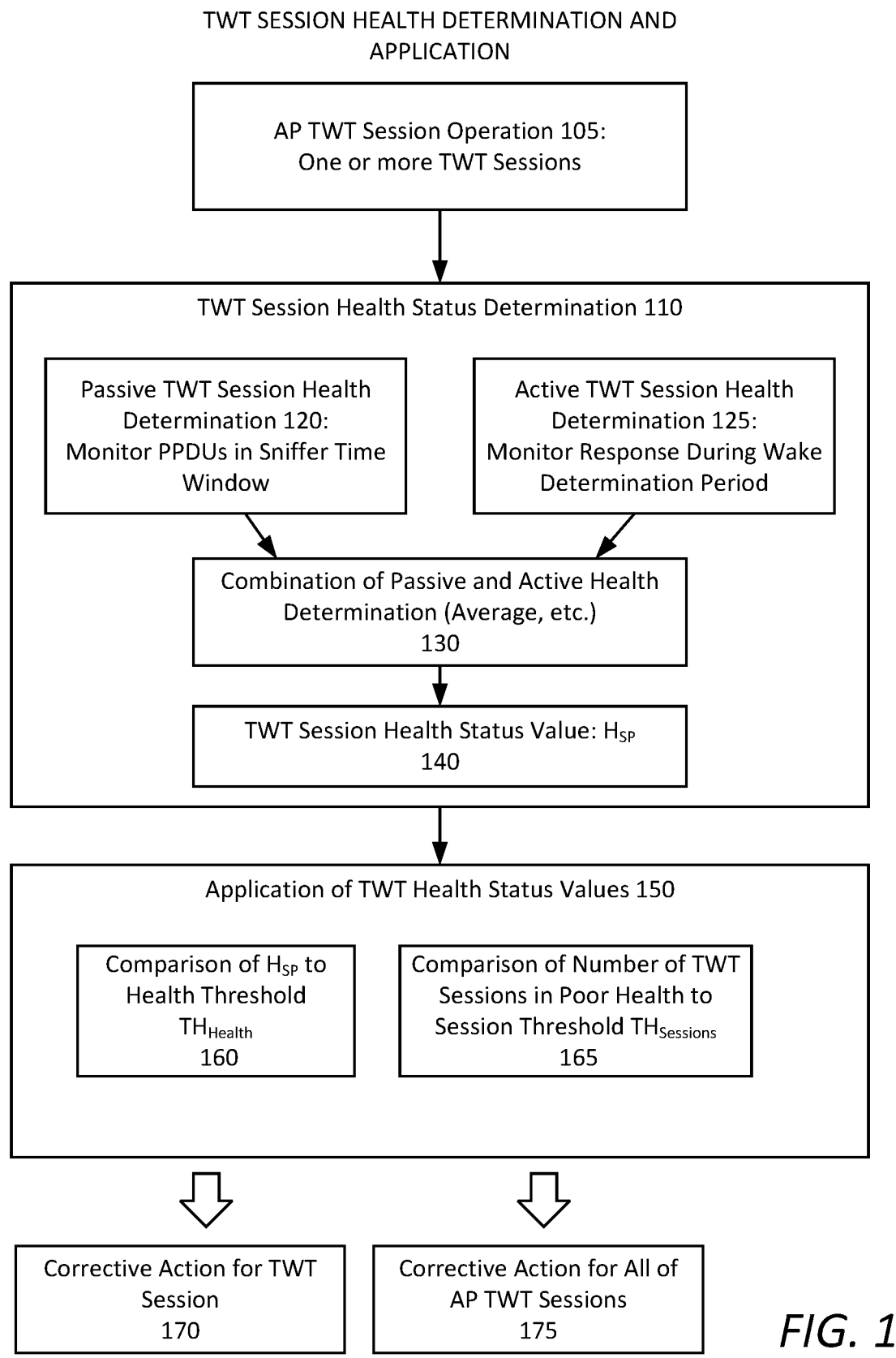
FIG. 1 is an illustration of TWT session health status determination and application, according to some embodiments.

Embodiments described herein are directed to maintenance and monitoring of target wait time (TWT) sessions.

The IEEE (Institute of Electrical and Electronics Engineers) 802.11ax standard, also referred to as Wi-Fi 6, and other 802.11 standards provide capabilities to improve the efficiency of wireless networks using infrastructure coordinated multi-user uplink and downlink transmissions. Such capabilities includes target wake time (TWT), which enables a device to determine when and how frequently it will wake up to send or receive data, such as in the transmission of PPDUs (PLCP (Physical Layer Convergence Procedure) Protocol Data Units). TWT technology allows 802.11ax access points to increase device sleep time and conserve battery life. The TWT feature was introduced in the IEEE 802.11ax standard, and is commonly used to improve high density clients' power save, especially for power sensitive IOT (Internet of Things) devices, in implementation of centralized power save control.

After TWT clients (also referred to herein simply as clients, or as stations (STAs)) have completed negotiation with a TWT access point (AP) (also referred to herein simply as an access point or AP), each client is able to enter a power-save mode, and is only required to wake up at the periodic TWT service period (SP) time for the respective TWT session. Each TWT client and TWT AP can establish a maximum of 8 TWT sessions. Each TWT session includes a particular parameter set that defines wake time, wake duration, and wake interval for the session.

However, a TWT parameter value set for a TWT session will in general remain in place until a modification request (such as a TWT teardown, TWT action, etc.) is sent out from TWT clients or from the TWT AP. Because of this, there is a risk that the client may have a TSF (Timing Synchronization Function) time shift in real world operation over a period of time, where the TSF is intended to keep timers for all stations in the same basic service set (BSS) synchronized, each station maintaining a local TSF timer. The TWT operation is based on the TSF time, and all subsequent TWT SP's (TWT Service Periods) are calculated according to the TWT Start TSF. As a result, if a time shift has occurred, the TWT client might wake up outside the TWT SP, and thus violate the TWT scheduling on both the TWT client side and the TWT AP side. Further, there is no specific definition to indicate when to change these TWT parameters for a TWT session in one TWT client.

In some embodiments, a TWT session health status value is established or calculated to determine or describe the health of an existing TWT session between TWT AP and a TWT client. Further, a process or mechanism is provided for detecting TWT session health status in an apparatus or system, and for making a determination to modify a TWT session based upon the TWT session health status value for the session, wherein modifying the TWT may include update, teardown, or re-negotiation of the TWT session. Further, a determination may be made to reset all TWT sessions associated with an AP based on the TWT session health status value for the sessions.

In some embodiments, the TWT session health status value may be utilized to describe the TWT scheduler accuracy (i.e., in terms of having PPDU transmission occurring within the TWT SP), to maintain the life of the TWT session for a longer period of time to support the intended operation, and to lower signal congestion and reduce collisions for other TWT clients (which may occur if transmission occurs outside of the appropriate TWT session), thus saving additional energy.

In some embodiments, the determined TWT session health status value is then applied to maintain TWT session quality by comparing the TWT session health status value (based on one or both of a passive measurement method and an active measurement method) to a threshold value. In some embodiments, if the accuracy of the TWT session scheme, based on the comparison of the comparison of the TWT session health status value to the threshold value, is within an established tolerance, a correction is not required. However, such comparison indicates that the TWT schedule accuracy has degraded, corrective action is to be taken. In some embodiments, the corrective action may include altering parameters of the agreed TWT session, or resetting all TWT sessions, such as by rebooting the AP.

As used herein, access point (AP) (also referred to as a wireless access point (WAP)) refers to a Wi-Fi networking hardware device that allows Wi-Fi devices to connect to a wired network, including connection to the Internet or an intranet. TWT access point refers to an access point that has established one or more TWT sessions. The AP may connect to a router (via a wired network) as a standalone device, or may be an integral component of the router itself. As used herein, Wi-Fi refers to operation under one or more IEEE (Institute of Electrical and Electronics Engineers) 802.11 protocols.

As used herein, client or station (STA) refers to a device including the capability to utilize IEEE 802.11 protocols, and may include, but is not limited to, an IoT (Internet of Things) devices (such as an IoT sensor), as well as a laptop, a desktop PC, tablet, Wi-Fi enabled cell phone, or other wireless device.

FIG. 1 is an illustration of TWT session health status determination and application, according to some embodiments. In general, the target wake time under IEEE 802.11ax and other 802.11 standards allows an AP to manage activity in the associated BSS (Basic Service Set) in order to minimize contention between multiple connected STAs in the BSS, and to reduce the required amount of time that a STA in PS (Power Save) mode needs to be awake for communication operation. This is achieved by allocating STAs to operate at non-overlapping times and/or frequencies, and concentrate the frame exchanges in predefined TWT service periods (TWT SP). The TWT SP (TWT Service Period, TWT_sp) is the range of time during which a TWT STA is to wake up for purposes of transmitting and receiving frames. At other times, the STA can transition to a sleep/low power state.

In operation, a TWT capable device (which includes both an AP and a client) can work as TWT requester and responder, and negotiation with TWT trigger frames. The AP commonly operates as a TWT responder, and operates to maintain different broadcast TWT parameters for TWT client group management, and works as the TWT scheduler. It is noted that TWT operations may vary according to a number of factors, such factors including:

Different working types (Individual TWT (iTWT) and Broadcast TWT (bTWT), with iTWT relating to specific client sessions and bTWT relating to multi-clients grouping);

Solicited TWT and unsolicited TWT (Solicited TWT being STA initiated TWT sessions with TWT request and unsolicited TWT being AP initiated TWT setup with STA);

Unannounced TWT and announced TWT (with unannounced TWT including AP sending frames to STA without any trigger from STA as soon as the SP starts, and announced TWT including AP sending frames to STA with trigger from STA as soon as the SP starts);

Implicit TWT and explicit TWT (with implicit TWT including the STA calculating the next SP start time by adding a fixed value (TWT Interval) to the current TWT value (SP start) to indicate in the field next twt, and explicit TWT including the STA performing a frame exchange and receiving the next TWT information from the responding STA(AP)); and Non-triggered TWT and trigger-enabled TWT (with non-triggered TWT including the STA not needing to wait for AP's trigger frames before it can send frames to AP, and trigger-enabled TWT including the STA being required to wait for AP's trigger frames before it sends frames to AP.

Each TWT session includes a particular TWT parameter value set. After a TWT session is set up or re-negotiated, the TWT parameter value set for the TWT session will include the parameters {TWT Wake Duration, TWT Wake Interval, TWT Start TSF}, where:

(a) Target Wake Time (same as the TWT Start TSF, TWT_start) is the offset after which the first TWT SP will start, where TSF refers to the timestamp indicating when air packet transmission is complete or received;

(b) TWT Wake Duration (TWT_dur) is the maximum time for TWT client wake up; and (c) TWT Wake Interval (TWT_intvl) is the interval between two successive TWT SPs, wherein TWT_dur value should be not more than the TWT_intvl value.

In some embodiments, an apparatus, system, or process includes TWT session health status determination 110 for access point TWT operation 105. The TWT session health status determination 110 includes one or more of the following:

(a) Passive TWT session health determination 120: In passive health determination, the AP is to monitor PPDUs (PLCP (Physical Layer Conformance Procedure) Protocol Data Unit) in a particular sniffer time window based on the wake duration and the wake interval (without, for example, a requirement for the TWT AP to actively transmit test frames to the TWT client).

(b) Active TWT session health determination 125: In active health determination, the TWT AP is to monitor the response of a TWT client apparatus or system to test frames transmitted by the AP during a wake duration period, and make a TWT health determination based at least in part on such monitoring.

In some embodiments, a TWT session health status value (Hsp) 140 is determined based at least in part on one or both of the passive TWT session health determination 120 and the active TWT session health determination 125. In some embodiments, the TWT session health status value 140 is determined based on a combination 135 of the active health determination and the passive determination (such as an average, a weighted average, or other combination of the active TWT session health status value and the passive TWT session health status value) to improve the accuracy of the TWT health status determination.

In some embodiments, the apparatus, system, or process further includes application of TWT session health status values 150. In some embodiments, the operation includes comparison of the determined TWT session health status value to a health threshold ($TH_{Health}$) to determine whether the health of the TWT session is within an established tolerance. In some embodiments, if the health of the TWT session is now within the established tolerance, this may require that correction action is to be taken for the TWT 170. In some embodiments, the corrective action may include altering parameters of the agreed TWT session.

In some embodiments, application of TWT session health status values 150 further includes comparison of a proportion or number of TWT sessions that are in poor health, based on determined TWT session health status value, to a threshold percentage or number of sessions ($TH_{Sessions}$). In some embodiments, if the number or percentage exceeds the threshold, this may require that correction action is to be taken for all of the TWT sessions of the AP 175. In some embodiments, the corrective action may include resetting all of such TWT sessions, such as by rebooting the AP.

Figure 2:
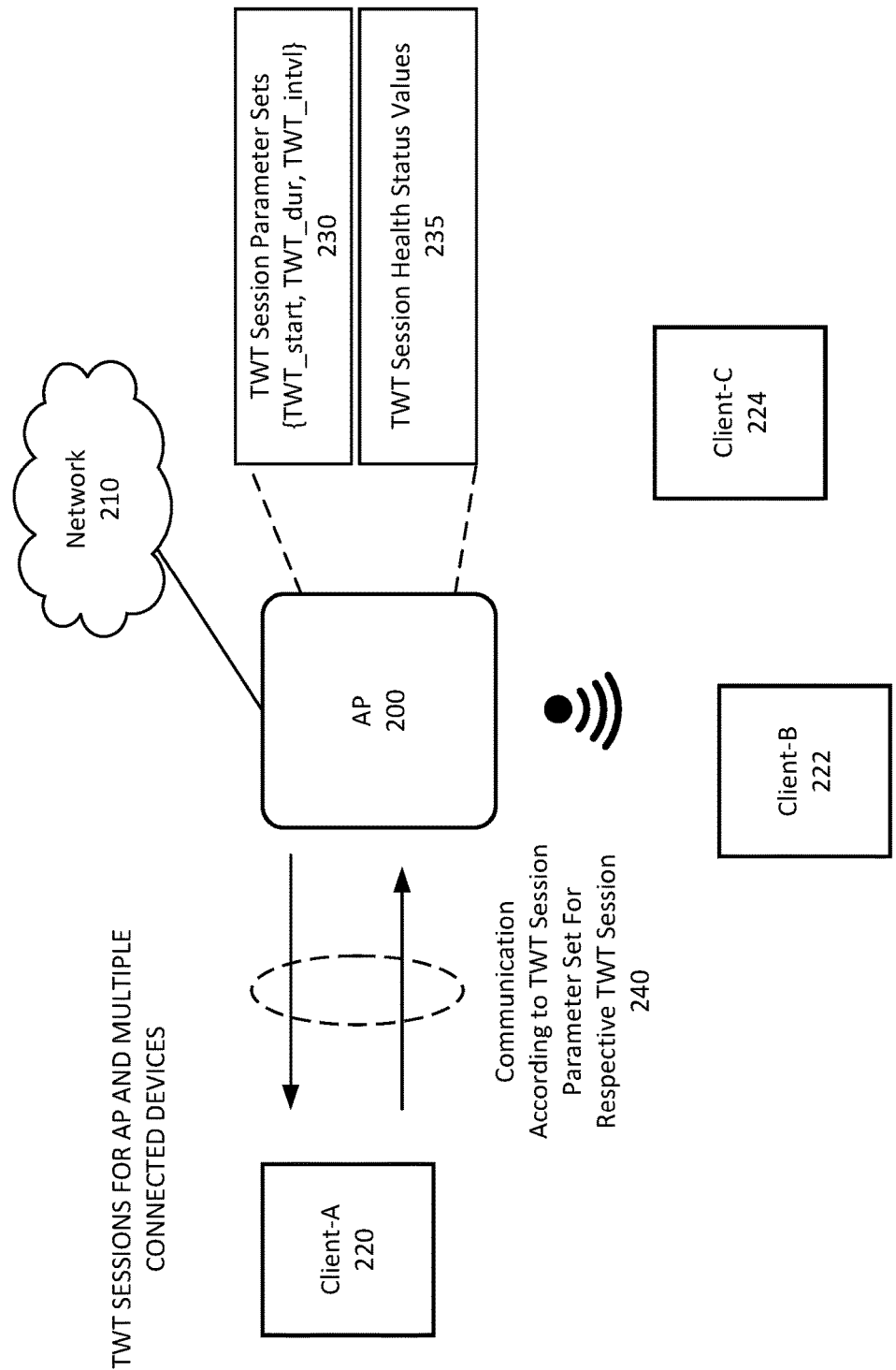
FIG. 2 is an illustration of access point and station operations utilizing target wait time sessions in Wi-Fi services, according to some embodiments.

FIG. 2 is an illustration of access point and station operations utilizing target wait time sessions in Wi-Fi services, according to some embodiments. In some embodiments, an access point 200, which may be connected to a network 210, is further connected with one or more client devices, the client devices being illustrated as, for example, Client-A 220, Client-B 222, and Client-C 224. The client devices 220-224 may include any wireless devices, including, but not limited to, one or more IoT (Internet of Things) sensors or other similar elements.

The access point 200 may utilize target wake time (TWT) technology to enable effective sleeping operations, allowing for reduction in power usage. The access point 200 may include storage of TWT session parameter sets 230 to reflect the TWT session, with each session parameter set including a target wake time (TWT Start TSF, TWT_start); TWT wake duration (TWT_dur); and TWT wake interval (TWT_intvl). In some embodiments, the access point 200 is further to determine and store TWT session health status values 235 representing the health of each TWT session. The determination of the TWT session health status values may be as illustrated for TWT session health status determination 110 in FIG. 1, and as further illustrated for passive and active TWT session health status determination in FIGS. 6A-7B.

For example, communications between AP 200 and Client-A 200 may be conducted according to the TWT parameter set for the respective TWT session 240. In some embodiments, the AP may apply the TWT session health status values 235 to determine whether corrective is required for one or more TWT session, as further illustrated in FIG. 5.

Figure 3:
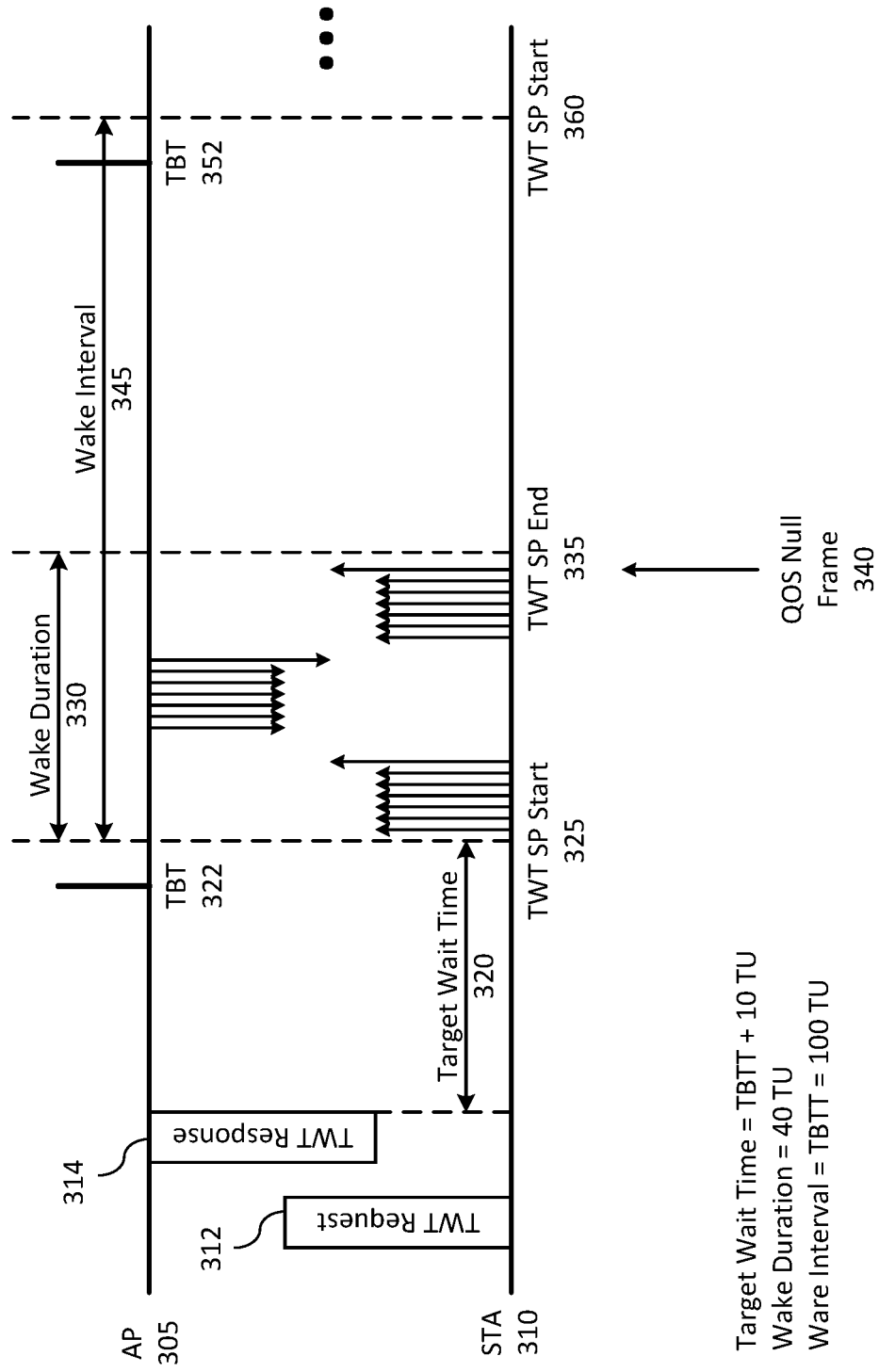
FIG. 3 is an illustration of TWT session operation at an access point and a station, according to some embodiments.

FIG. 3 is an illustration of TWT session operation at an access point and a station, according to some embodiments. As shown in FIG. 3 (which is not drawn to scale), an access point (AP) 305 and a station (STA) 310 are in communication establish and utilize a TWT session to allow for power savings in communications. For example, STA 310 may transmit a TWT request 312, and the AP 305 may generate and transmit a TWT response 314 to establish the TWT session, wherein the TWT session may include a particular set of parameters including a target wake time (TWT Start TSF, TWT_start); TWT wake duration (TWT_dur); and TWT wake interval (TWT_intvl).

As illustrated in FIG. 3, following a target wait time 320, wherein the target wait time in this example ends at a target beacon transmit time (TBTT) between target beacon transmissions (TBT) (with the TBTs shown as TBT 322 and 352) plus 10 TU (TU=Time Unit=1024 microseconds). Following the target wait time 320 the TWT SP start 325 occurs, the TWT SP start 325 being the start of the wake duration 330 for the TWT service period, which ends with TWT SP end 335. Also shown is the full wake interval 345, which is the time between TWT SP start 325 and a next TWT SP start 360. In this illustration, the wake duration 330 equals 40 TU, and the wake interval equaling the TBTT value, or 100 TU.

As shown in FIG. 3, upon the TWT SP start 325 commencing the wake duration 330 of the TWT session, the STA 310 can wake and engage with transmissions to and from the AP 305. (The transmissions shown are only an illustration. Communications may include any transmissions between the AP 305 and the STA 310, as appropriate for the operation of the particular STA.) At the end of the wake duration 330, the STA 310 is to end transmission, shown as, for example, transmission of a QoS null frame 340 (which provides a flag without data). The STA 310 can then return to a low power/sleep state until the next wake period at TWT SP 360, thus saving power and minimizing signal collisions with other stations that have different TWT scheduling.

However, if the STA 310 (or the AP 305)) has a time shift, then the timing for the commencement of each TWT session will not be correct, thus resulting in inefficient operation, and potentially failure of communication. This is further illustrated in FIG. 4. In some embodiments, the AP 305 includes a capability of determining a TWT session health status value for the session, and to utilize such value to determine whether corrective action is required for the TWT session, and whether corrective action is required for all TWT sessions of the AP 305.

Figure 4:
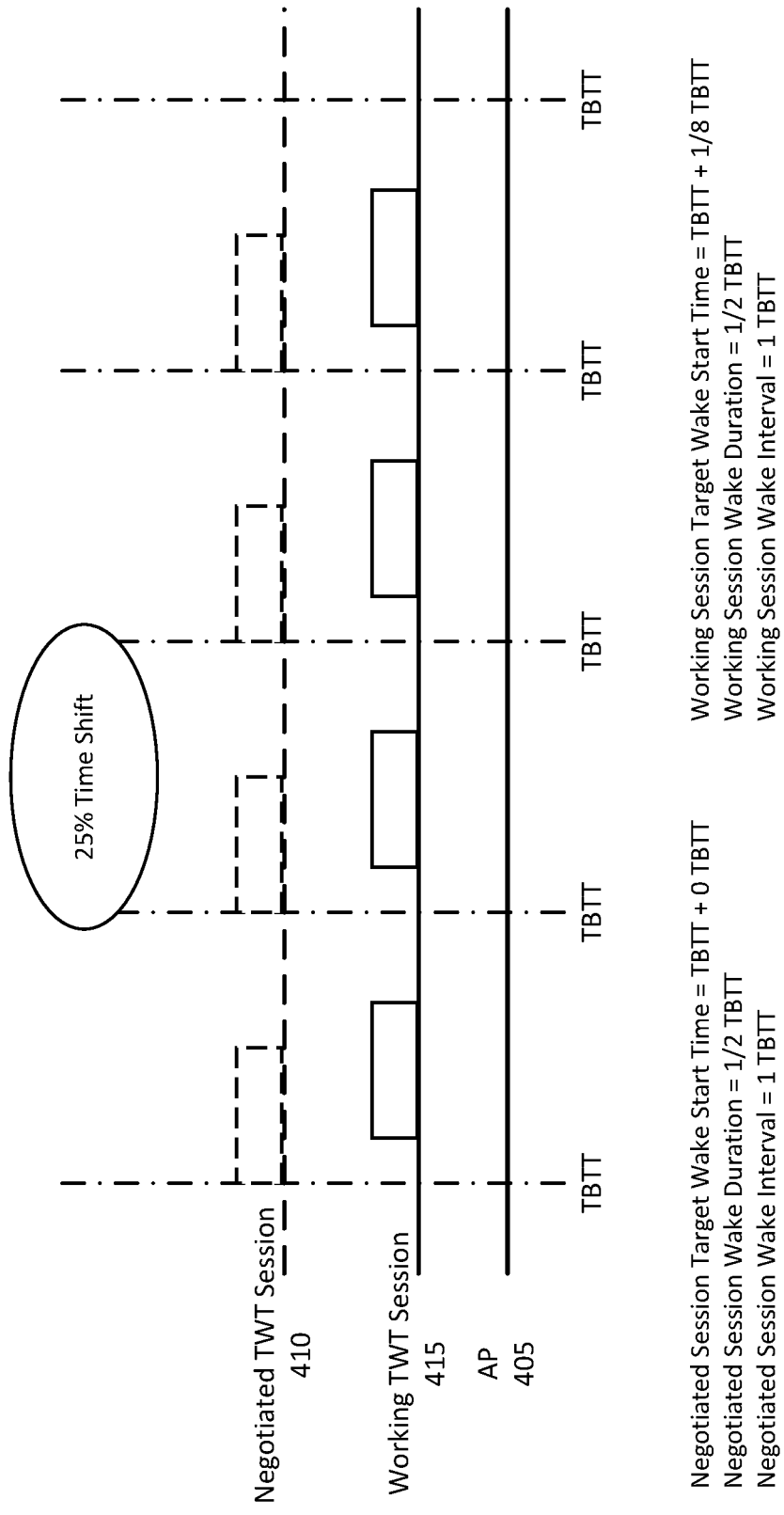
FIG. 4 is an illustration of TWT session operation with a time shift, according to some embodiments.

FIG. 4 is an illustration of TWT session operation with a time shift, according to some embodiments. As shown in FIG. 4 (which is not drawn to scale), an access point (AP) 405 has negotiated a TWT session 410 with a particular STA. (The STA is not shown in FIG. 4.) In this particular illustration, the negotiated session target wake start time equals a TBTT time (TBTT plus 0 TBTT). The negotiated session wake duration is ½ TBTT, and the negotiated session wake interval is 1 TBTT. If working properly, each TWT service period will start at the TBTT point, and the transmission between the AP and STA will occur within the TWT service period.

However, if there is a 25% time shift by the STA, as shown in FIG. 4, then the working (actual) TWT session 415 may have a working session target wake start time TBTT plus ⅛ TBTT, while the working session wake duration would again be ½ TBTT, and the working session wake interval being 1 TBTT. Each TWT session thus would be shifted in such a way that the respective station should commence transmission late, and continue transmission outside of the expected session duration. (It is noted that the time shift could also be in the other direction so that the session starts early, rather than late.)

In some embodiments, the AP 405 is to determine a TWT session health status value for the TWT session, and thus enable the AP to determine whether the TWT session is operating within an acceptable tolerance. If not, the TWT session requires corrective action, such as to altering parameters of the negotiated TWT session. Further, corrective action may be required to reset all TWT sessions, such as by rebooting the AP 405. Application of the TWT session health status value is further illustrated in FIG. 5.

Figure 5:
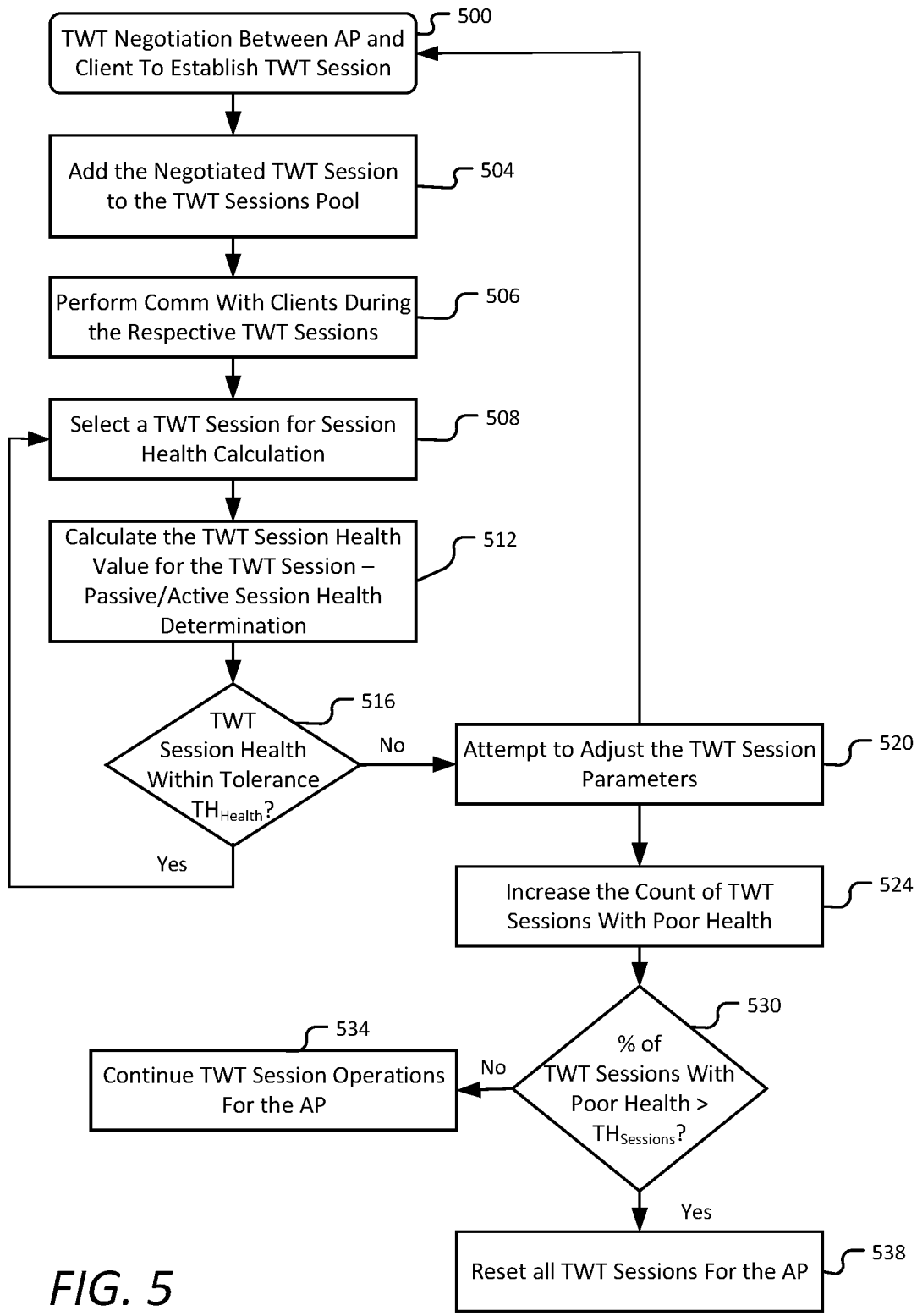
FIG. 5 is a flow chart to illustrate application of TWT session heath status values to maintain TWT sessions on the AP side, according to some embodiments.

FIG. 5 is a flow chart to illustrate application of TWT session heath status values to maintain TWT sessions on the AP side, according to some embodiments. In some embodiments, upon conducting TWT negotiation between an AP and a client to establish a TWT session 500, the negotiated TWT session can be added to a TWT session pool 504. The AP then can perform communication operations with the client devices during the respective TWT sessions 506.

However, one or more time shifts, such as illustrated in FIG. 4, may develop over time, and may result in reduced efficiency or failure in AP-client communications because this will cause one or more stations to conduct transmission operations outside of the respective TWT service periods. In order to maintain TWT operation, an AP may determine a TWT session health status value for each TWT session, and apply such values in evaluating sessions and instituting corrective action as needed.

Figure 6A:
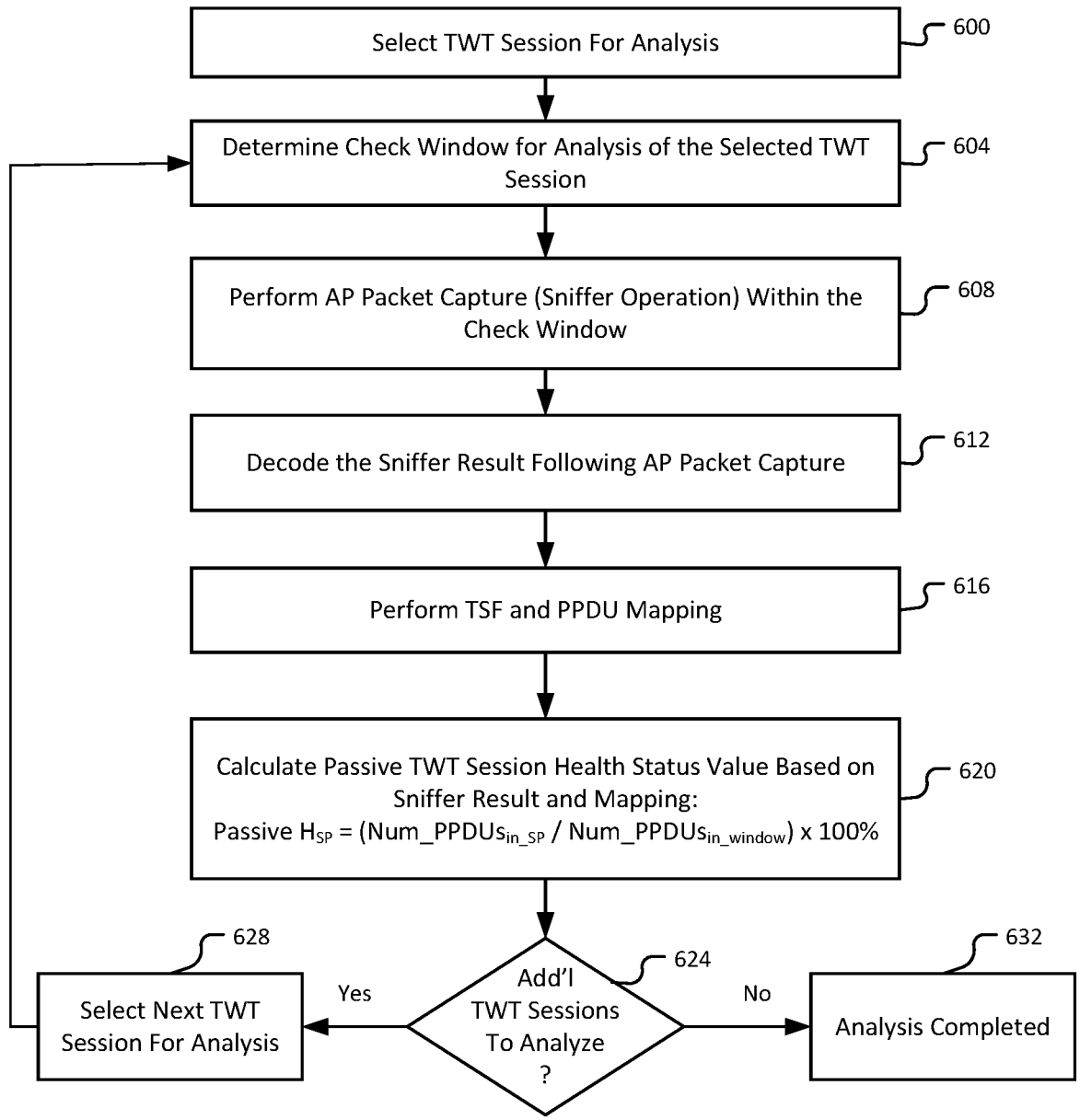
FIG. 6A is a flow chart to illustrate calculation of TWT session health status values utilizing a passive operation, according to some embodiments.
Figure 6B:
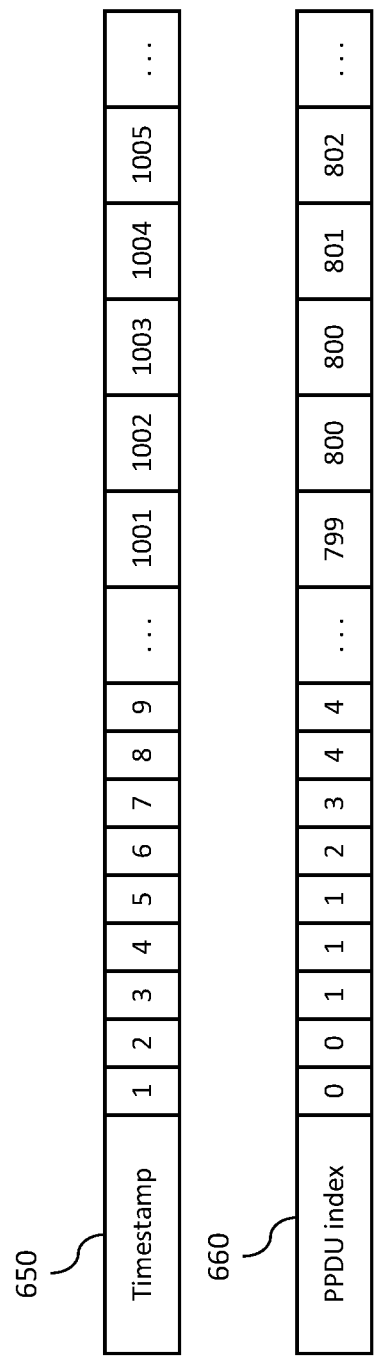
FIG. 6B is an illustration of timestamp and PPDU index values utilized in determination of TWT health status values, according to some embodiments.
Figure 7A:
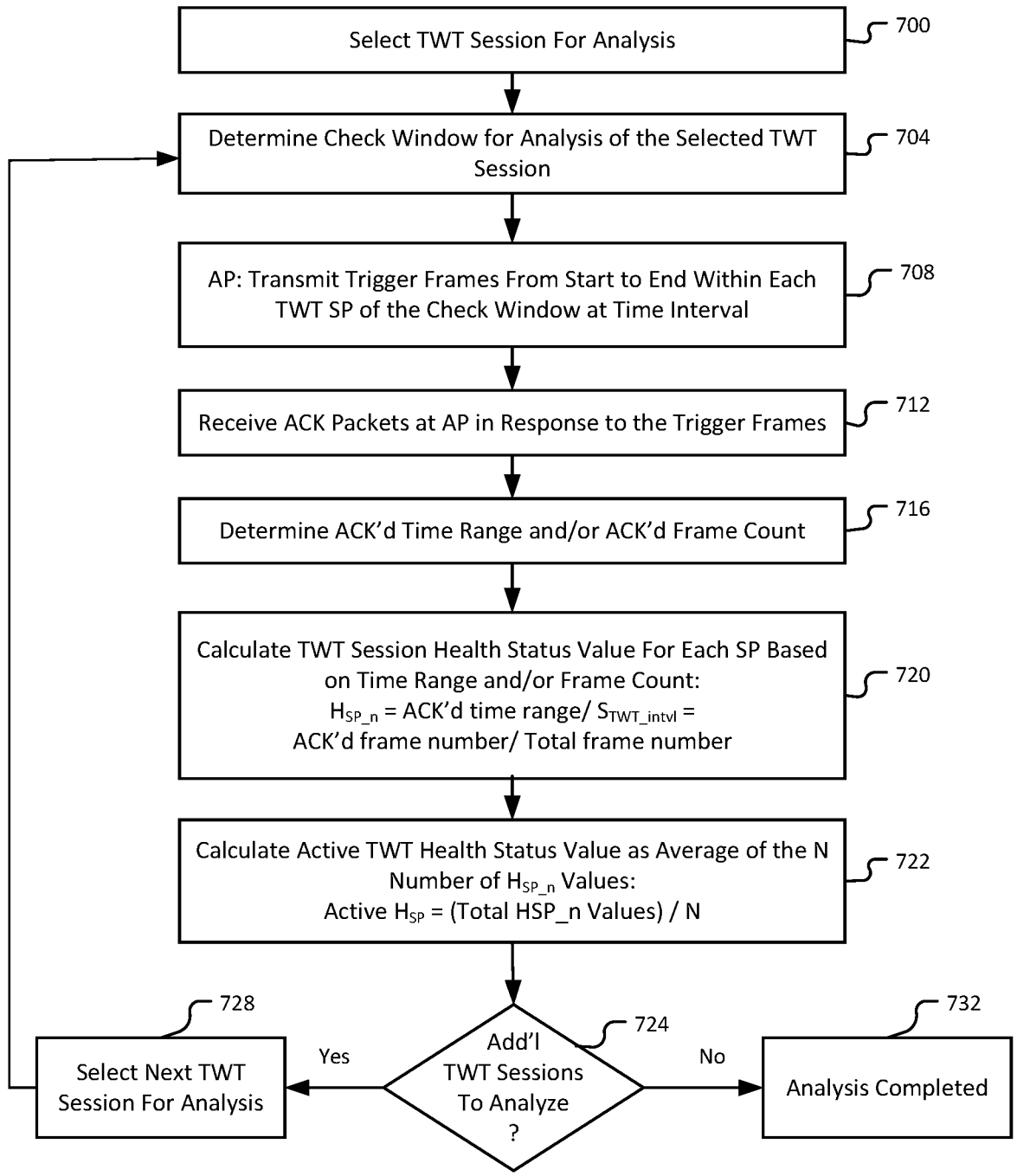
FIG. 7A is a flow chart to illustrate calculation of TWT session health status values utilizing an active operation, according to some embodiments.
Figure 7B:
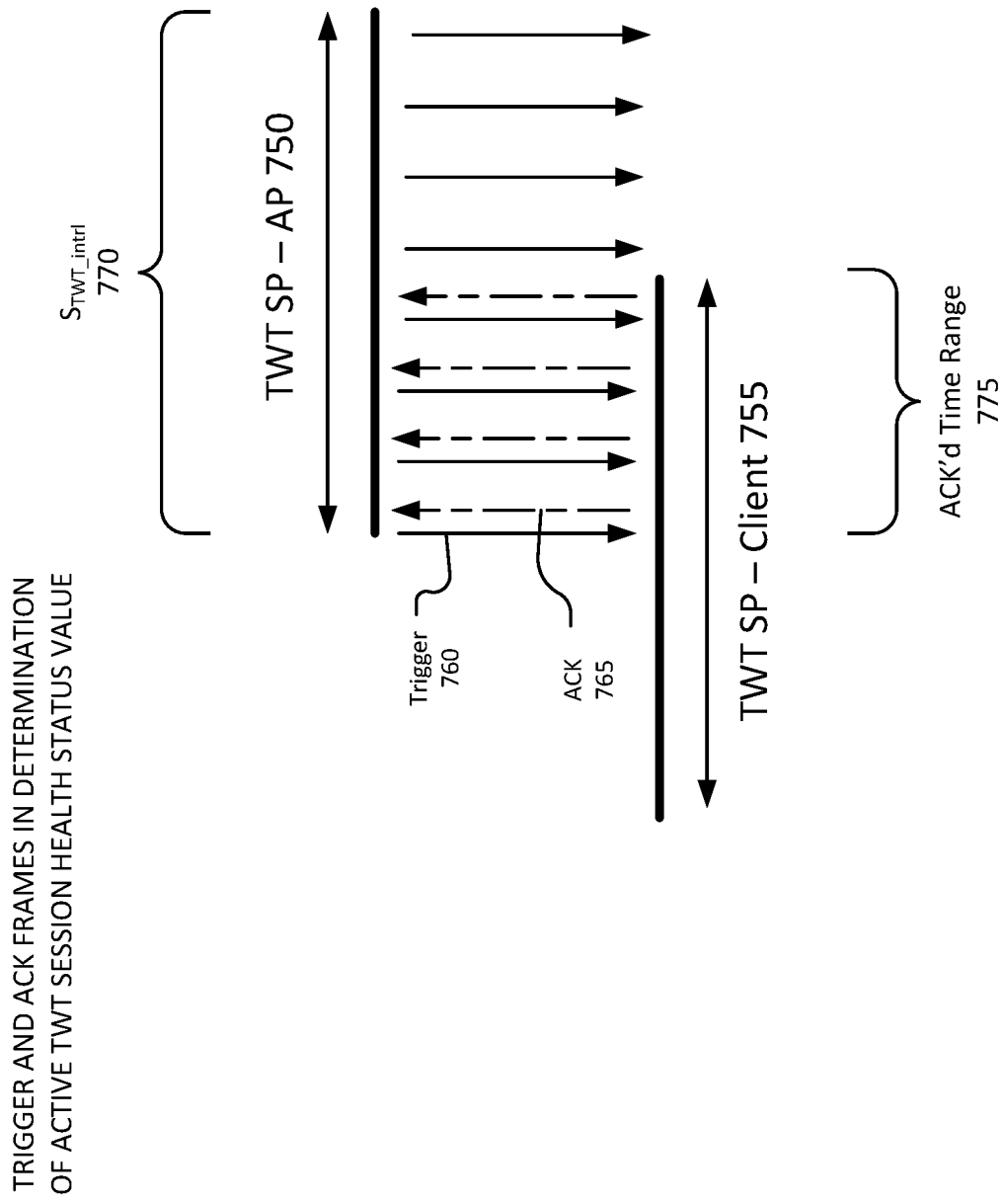
FIG. 7B is an illustration of trigger and ACK frames in determination of active TWT session health status values, according to some embodiments.

In some embodiments, the AP is to select a TWT session for session health calculation 508. Each TWT session may be evaluated, for example, periodically, upon a particular event, or when time is available for the AP. A TWT session health status value is then calculated for the TWT session 512. The calculation may be based upon one or both of a passive TWT session health determination, such as illustrated in FIGS. 6A and 6B, or an active TWT session health determination, such as illustrated in FIGS. 7A and 7B. The resulting TWT session heath status value may be percentage that expresses a percentage of the transmissions or period of transmission between a TWT AP and TWT client that successfully provided within a negotiated TWT SP for the TWT session.

Upon calculating the TWT session health value, the determined value is compared against a threshold for TWT health status ($TH_{Health}$, a first threshold value) to determine whether the session health is within a required tolerance 516. For example, the threshold for TWT health status may be 90%, thus requiring that at least 90% of PPDU transmission be successfully transmitted within the TWT SP to meet the required tolerance. If the session health is within the required tolerance, then the process may return to selecting another TWT session for session health calculation 508.

However, if the TWT session health status value is not with the required tolerance 516, such as if a sufficient time shift has occurred for client that less than 90% of transmission are within the TWT SP, then there may be corrective action in an attempt to adjust the TWT session parameter accordingly 520, which may enable parameter set to better match with the actual TWT session operation, and thus improve communication performance.

In some embodiments, the process further includes increasing a count of TWT session having health issues 524. A determination is then made whether the proportion of AP TWT sessions having poor health (i.e., a percentage of TWT sessions that have issues and thus that are not with the required tolerance) is greater than a threshold for TWT AP sessions with poor health ($TH_{Sessions}$, a second threshold value) 530. For example, the second threshold value may be 20%, thus requiring that the percentage of TWT sessions that have poor health should not exceed 20% of the total number of TWT sessions for the AP.

If the percentage of TWT sessions that have poor health does not exceed $TH_{Sessions}$, then the TWT session operations for the AP may continue 534. If the threshold $TH_{Sessions}$ is exceeded, then further corrective action may be implemented, such as resetting all of the TWT sessions 538, which should then return all TWT sessions to a new healthy state.

An embodiment may also be expressed as follows:
If TWT session health status value>=$TH_{Health}$
   TWT session is within required tolerance, no need to modify the TWT session until there is a TWT modify request from AP or client
Else
   TWT session is not within tolerance, need to implement routine to modify the TWT session
If percentage of total TWT sessions having poor health>$TH_{Sessions}$
   Reset all TWT sessions of the AP, such as by re-booting the AP
Else
   The existing TWT sessions of the AP can continue in operation FIG. 6A is a flow chart to illustrate calculation of TWT session health status values utilizing a passive operation, according to some embodiments; and FIG. 6B is an illustration of timestamp and PPDU index values utilized in determination of TWT health status values, according to some embodiments. Upon a TWT session being negotiated and established, the TWT AP and TWT client are to transmit PPDUs inside of the TWT SPs. In some embodiments, TWT session health status may be determined utilizing the percent of the PPDUs that are successfully transmitted within TWT SPs for both the TWT AP and the client.

As illustrated in FIG. 6A, a TWT session for a particular TWT client is selected for analysis 600, and a TWT SP check window is defined for the analysis 604. For the TWT client, the TWT session has TWT parameters set $\{S_{TWT\_start}, S_{TWT\_dur}, S_{TWT\_intvl}\}$. In some embodiments, an integer $N*S_{TWT\_intvl}$ is selected as the TWT SP check window time for the PPDUs sniffer: sniffer_check_TWTSP_window (N>=1). Thus, the TWT SP check window include a set of multiple TWT wake intervals in order to measure transmission occurring inside and outside of the TWT service periods.

The process proceeds with performing AP capture (sniffer operation) of PPDUs within the determined TWT SP check window for the TWT session 608. For example, the capture time is greater than the sniffer_check_TWTSP_window time, and will use the TWT client's MAC address as sniffer packets address filter. Each PPDU contains a TSF timestamp, and may be utilized to implement a PPDU TSF timestamp and PPDUs index mapping algorithm: PPDU_index=map(TSF).

FIG. 6B provides an illustration of the timestamp 650 and PPDU index values 660 utilized in determination of TWT health status values, according to some embodiments. For example: for map(TWTSP_window begin+1)=0 in the PPDU index, and map(TWTSP_window begin+6)=2 in the PPDU index, indicating a total of 2 PPDUs in the time offset 6 to 1.

In some embodiments, the sniffer result is decoded following the AP packet capture operation 612, and the operation includes TSF (TSF referring to the TSF timestamp indicating when air packet transmission is complete or received) and PPDU (referring to the air packets that are transmitted between the AP and client) mapping 616 to determine which PPDUs are or are not successfully transmitted within TWT SPs.

In this process, a calculation is made for the TWT SP time range periods within the TWT SP check window time. For example, there may be {First_SPstart, First_SPstart+sniffer_check_TWTSP_window} time range to calculate TWT session health value. In this range, the first SP start time in the TWT SP check window is First_SP$_{start}$, and the first beacon TSF timestamp in sniffer is First_Beacon$_{tsf}$. Using these values:

First_SP$_{start}$=First_Beacont$_{sf}$+S$_{TWT\_intvl}$−((First_Beacon$_{tsf}$−SP$_{TWT\_start}$)mod S$_{TWT\_intvl}$)

SP time period: S$_{TWT\_intvl}$

Seq_SP$_{start}$=First_SP$_{start}$+Seq_index*S$_{TWT\_intvl}$;

Seq_SP$_{end}$=Seq_SP$_{start}$+S$_{TWT\_dur}$;

Where Seq_index is the SP sequence number in the TWT SP check window time.

The total number of PPDUs in the sniffer_check_TWT-SP_window and in SPs coverage is then calculated as follows:

PPDUs total number in the sniffer check TWTSP_window: Num_PPDUs$_{In\_Window}$;

Num_PPDUs$_{In\_Window}$=map(First_SP$_{start}$+sniffer_check_TWTSP_window)−map(First_SP$_{start}$)= Last PPDU index−First PPDU index;

PPDUs total number in the SPs coverage: Num_PPDUs$_{In\_SPs}$;

Num_PPDUsIn_SP=Total PPDUs in{Seq_SP$_{start}$, Seq_SP$_{end}$}=Total (map(Seq_SP$_{start}$)−map(Seq_SP$_{end}$));

In some embodiments, a TWT health status value is then calculated based on the sniffer result and the TSF and PPDU mapping, and more specifically the proportion of the PPDUs that are successfully transmitted within one or more the TWT SPs of the check window, as follows:

TWT session health status value=(Num_PPDUs$_{in\_SP}$/ Num_PPDUs$_{in\_window}$)×100%

Where:

Num_PPDUs$_{in\_SP}$=the number of PPDUs within the one or more TWT SPs

Num_PPDUs$_{in\_window}$=the number of PPDUs within the full check window

In some embodiments, the process may proceed with analysis of any further TWT sessions that require analysis. This may be, for example, a determination whether there are any additional TWT session to analyze 624. If so, then a next TWT session is selected for analysis 628, and the process may return to determining a check window for analysis of the selected TWT session. If not, then the analysis is completed 632.

FIG. 7A is a flow chart to illustrate calculation of TWT session health status values utilizing an active operation, according to some embodiments; and FIG. 7B is an illustration of trigger and ACK frames in determination of active TWT session health status values, according to some embodiments. It is noted that in a passive TWT health status determination, as illustrated in FIGS. 6A and 6B, test results may not cover all of the TWT SP time range because the measurements are based passively on the PPDU transmissions between the AP and STA, and thus the test result may not precisely measure the TWT session health status. In some embodiments, an active TWT session health status value is determined utilizing a series of trigger frames that are transmitted from the AP to the STA and ACK (acknowledgment) frames that are transmitted in response from the STA to the AP. In this way, the active process may provide better measurement coverage, and thus provide a more accurate measurement of TWT session health status.

As illustrated in FIG. 7A, a TWT session for a particular TWT client is selected for analysis 700, and a TWT SP check window is defined for the analysis 704. For the TWT client, the TWT session has TWT parameters set {S$_{TWT\_start}$, S$_{TWT\_dur}$, S$_{TWT\_intvl}$}. In some embodiments, an integer N*S$_{TWT\_intvl}$ is selected as the TWT SP check window. Thus, the TWT SP check window include a set of multiple TWT wake intervals in order to measure transmission occurring inside and outside of the TWT service periods.

The process proceeds with transmission of trigger frames from the AP to the STA from the start (TWT SP Start) to end (TWT SP End) of each TWT SP during the check window 708. In some embodiments, the trigger frames are transmitted at a particular time interval, such as a trigger frame being transmitted every n TUs during each TWT SP. The trigger frames may include PS-Poll frame (PS refers to Power Save), a Null frame, or other frame from the AP that will be result in an ACK frame in response from the STA.

The AP then is to receive the ACK packets sent from the STA in response to the trigger frames 715, and determine an ACK'd time range (time range of the TWT SP in which ACK frames are received in response to the trigger frames) or ACK'd frame count (count of the ACK frames received in the TWT SP).

For example, as illustrated in FIG. 7B, the TWT SP for the AP 750 may not be aligned with the TWT SP for the client 755. (The amount of misalignment is exaggerated in FIG. 7B for ease of illustration.) In determining the TWT session health status the AP is to transmit multiple trigger frames 760, such as at a particular time interval, and to detect ACK frames 765 sent are sent from the client in response to the trigger frames 760. The AP is further to determine an ACK'd time range 775 in which the transmission operation is occurring with the TWT SP of the AP 750 and/or count the number of ACK frames 765 that are received in response to the total number of trigger frames 760 in the TWT interval (S$_{TWT\_intvl}$) 770.

Returning to FIG. 7A, the AP is to calculate a TWT session health status value (H$_{SP\_n}$) for each SP based on the time range or ACK frame count 720:

H$_{SP\_n}$=ACK'd time range/S$_{TwT\_intvl}$=ACK frame number/Total frame number The AP is then to calculate an active TWT session health value for the full TWT SP check window as an average of the N number of H$_{SP\_n}$ values 722:

Active H$_{SP}$=(Total H$_{SP\_n}$ Values)/N

In some embodiments, the process may proceed with analysis of any further TWT sessions that require analysis. This may be, for example, a determination whether there are any additional TWT session to analyze 724. If so, then a next TWT session is selected for analysis 728, and the process may return to determining a check window for analysis of the selected TWT session. If not, then the analysis is completed 732.

Figure 8:
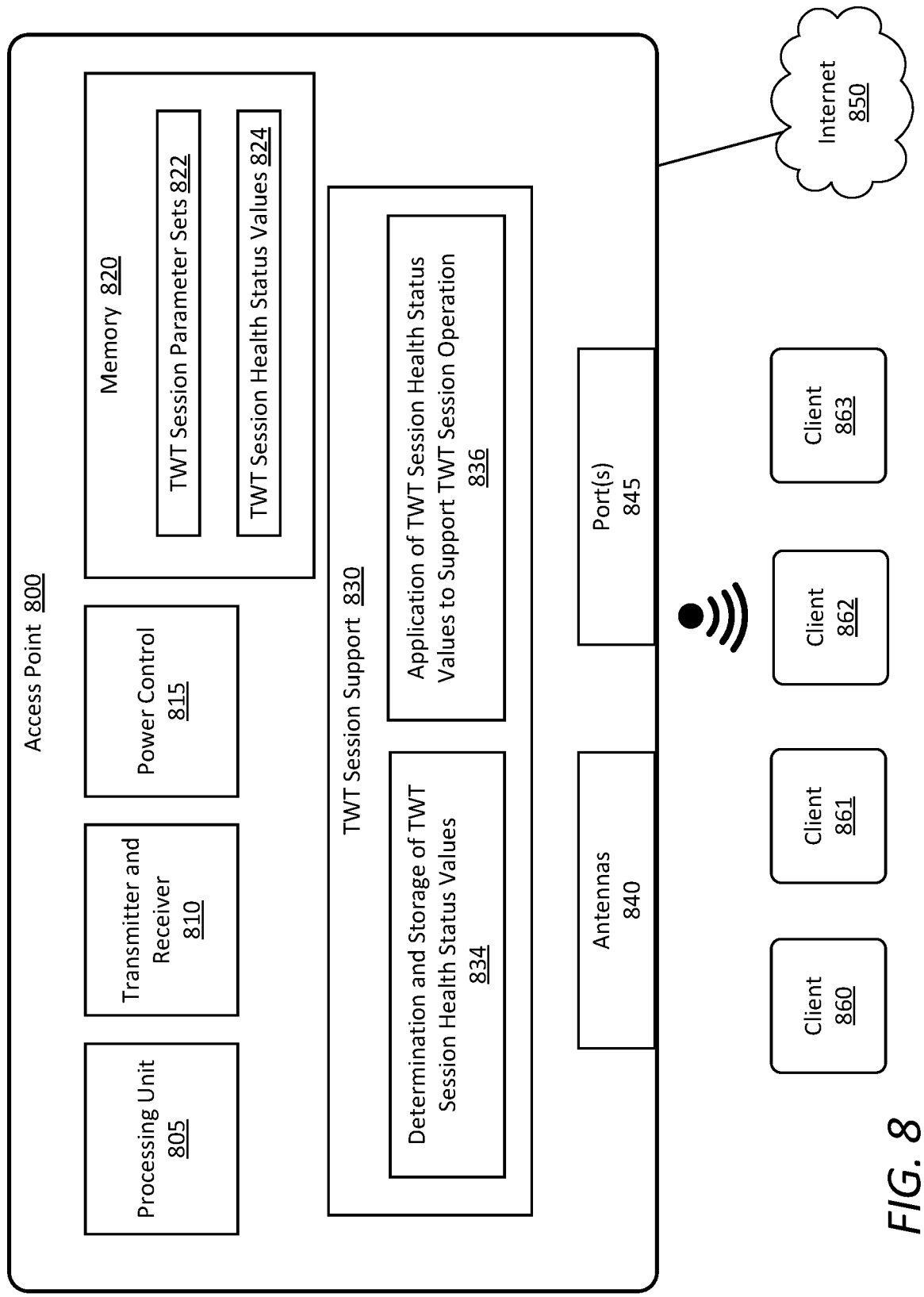
FIG. 8 illustrates an access point to provide TWT session health status determination and application, according to some embodiments.

FIG. 8 illustrates an access point to provide TWT session health status determination and application, according to some embodiments. An access point will further include additional components and elements that not illustrated in FIG. 8, which is simplified for sake of illustration. The illustrated access point 800 may include an access point including capability to operate under the IEEE 802.11ax standard or a later standard.

The access point 800 may include a processing unit 605, a transmitter and receiver 810, power control 815, and one or more memories 820 for the storage of data, which may include volatile memory (such as DRAM (Dynamic Random Access Memory)) and nonvolatile memories (such as a ROM (Read Only Memory), flash memory, and other memory technologies). In some embodiments, the one or more memories 820 may include storage of TWT session parameter sets for each TWT session that is negotiated between the access point 800 and a client device in the associated BSS, the client devices being illustrates as client devices 860, 861, 862, and 863. In some embodiments, the one or more memories 820 further includes storage of TWT session health status values 824 that are calculated for each of the TWT sessions.

In some embodiments, the access point 800 further includes TWT session support 830, which may include software, firmware, or hardware to support TWT operations. The TWT session support 830 may include determination and storage of TWT session health status values 834 (which may include either or both of passive TWT health status determination as illustrated in FIGS. 6A and 6B and active TWT health status determination as illustrated in FIGS. 7A and 7B). The TWT session support 830 may include application of TWT session health status values to support TWT session operation 836 (which may include operations as illustrated in FIG. 5.)

The access point 800 further includes multiple antennas 840 for wireless signal communication, and one or more ports 845 for network connections or other connections, including network uplink to the Internet 850.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to embodiments and examples described herein.

In some embodiments, one or more non-transitory computer-readable storage mediums having stored thereon executable computer program instructions that, when executed by one or more processors, cause the one or more processors to perform operations including: negotiating at least a first target wake time (TWT) session between an access point and a first station, the first TWT session having a first set of parameters defining a wake time, wake duration, and wake interval for service periods of the first TWT session; selecting the first TWT session for health status determination; selecting a check window for the health status determination and monitor transmissions from the first station within the check window; based at least in part on the monitoring of the transmissions from the first station, calculating a first TWT session health status value for the first TWT session; and determining whether corrective action is required for the first TWT session based at least in part on the first TWT session health status value.

In some embodiments, a access point includes one or more processors; a transmitter and receiver to communicate with a plurality of stations; and a memory for storage of data including data regarding the plurality of stations, wherein the access point is to negotiate at least a first target wake time (TWT) session for a first station, the first TWT session having a first set of parameters defining a wake time, wake duration, and wake interval for service periods of the first TWT session; select the first TWT session for health status determination; select a check window for the health status determination and monitor transmissions from the first station within the check window; based at least in part on the monitoring of the transmissions from the first station, calculate a first TWT session health status value for the first TWT session and store the first TWT session health status value in the memory; and determine whether corrective action is required for the first TWT session based at least in part on the first TWT session health status value.

In some embodiments, a method includes negotiating at least a first target wake time (TWT) session between an access point and a first station, the first TWT session having a first set of parameters defining a wake time, wake duration, and wake interval for service periods of the first TWT session; selecting the first TWT session for health status determination; selecting a check window for the health status determination and monitoring transmissions from the first station within the check window; based at least in part on the monitoring of the transmissions from the first station, calculating a first TWT session health status value for the first TWT session; and determining whether corrective action is required for the first TWT session based at least in part on the first TWT session health status value.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. One or more non-transitory computer-readable storage mediums having stored thereon executable computer program instructions that, when executed by one or more processors, cause the one or more processors to perform operations comprising:
   negotiating at least a first target wake time (TWT) session between an access point and a first station, the first TWT session having a first set of parameters defining a wake time, wake duration, and wake interval for service periods of the first TWT session;
   selecting the first TWT session for health status determination;
   selecting a check window for the health status determination and monitor transmissions from the first station within the check window;
   based at least in part on the monitoring of the transmissions from the first station, calculating a first TWT session health status value for the first TWT session; and
   determining whether corrective action is required for the first TWT session based at least in part on the first TWT session health status value.

2. The one or more storage mediums of claim 1, wherein determining whether corrective action is required for the first TWT session includes:
   comparing the first TWT session health status value to a first threshold value; and
   upon determining that the first TWT session health status value does not meet the first threshold value, determining that the corrective action is needed.

3. The one or more storage mediums of claim 2, wherein the corrective action includes adjusting one or more parameters of the first parameter set.

4. The one or more storage mediums of claim 2, further including instructions for:
   upon determining that the first TWT session health status value does not meet the first threshold value, adding the first TWT session to a count of TWT sessions with poor health;
   determining a proportion of a total number of TWT sessions for the access point are TWT sessions with poor health;
   comparing the proportion to a second threshold value; and
   upon determining that the proportion is above the second threshold, determining that corrective action is required for the TWT sessions of the access point.

5. The one or more storage mediums of claim 4, wherein the corrective action for the TWT session of the access point includes resetting all of the TWT sessions of the access point.

6. The one or more storage mediums of claim 1, wherein the check window includes a plurality of wake intervals for the first TWT session.

7. The one or more storage mediums of claim 1, wherein the first TWT session health status value is based on one or both of a passive TWT session health determination and an active TWT session health determination.

8. The one or more storage mediums of claim 7, wherein the first TWT session health status value is based at least in part on the passive TWT session health determination, and further including instructions for:
   performing a sniffer operation at the access point to capture packets from the first station during one or more wake intervals for the first TWT session;
   mapping the captured packets; and
   calculating a passive TWT health status value based at least in part on a proportion of the captured packets that are received within one or more service periods for the first TWT session.

9. The one or more storage mediums of claim 7, wherein the first TWT session health status value is based at least in part on the active TWT session health determination, further including instructions for:
   transmitting a series of trigger frames from the access point to the first station during one or more service periods of the first TWT session;
   receiving ACK frames at the access point from the first station in response to the series of trigger frames; and
   calculating an active TWT health status value based at least in part on comparison of a number of or time period of the received ACK frames to a number or time period of the transmitted trigger frames.

10. The one or more storage mediums of claim 9, wherein the trigger frames include one or more of a PS (Power Save)-Poll frame or a Null frame.

11. A access point comprising:
one or more processors;
a transmitter and receiver to communicate with a plurality of stations; and
a memory for storage of data including data regarding the plurality of stations;
wherein the access point is to:
- negotiate at least a first target wake time (TWT) session for a first station, the first TWT session having a first set of parameters defining a wake time, wake duration, and wake interval for service periods of the first TWT session;
- select the first TWT session for health status determination;
- select a check window for the health status determination and monitor transmissions from the first station within the check window;
- based at least in part on the monitoring of the transmissions from the first station, calculate a first TWT session health status value for the first TWT session and store the first TWT session health status value in the memory; and
- determine whether corrective action is required for the first TWT session based at least in part on the first TWT session health status value.

12. The access point of claim 11, wherein determining whether corrective action is required for the first TWT session includes the access point further to:
- compare the first TWT session health status value to a first threshold value; and
- upon determining that the first TWT session health status value does not meet the first threshold value, determine that the corrective action is needed.

13. The access point of claim 12, wherein the access point is further to:
- upon determining that the first TWT session health status value does not meet the first threshold value, add the first TWT session to a count of TWT sessions with poor health;
- determine a proportion of a total number of TWT sessions for the access point are TWT sessions with poor health;
- compare the proportion to a second threshold value; and
- upon determining that the proportion is above the second threshold, determine that corrective action is required for the TWT sessions of the access point.

14. The access point of claim 13, wherein the corrective action for the TWT session of the access point includes resetting all of the TWT sessions of the access point.

15. The access point of claim 11, wherein the first TWT session health status value is based on one or both of:
- a passive TWT session health determination including the access point to perform a sniffer operation at the access point to capture packets from the first station during one or more wake intervals for the first TWT session; and
- an active TWT session health determination including the access point to transmit a series of trigger frames from the access point to the first station during one or more service periods of the first TWT session and receive ACK frames at the access point from the first station in response to the series of trigger frames.

16. The access point of claim 11, wherein the access point operates under IEEE (Institute of Electrical and Electronic Engineers) 802.11ax protocol.

17. A method comprising:
- negotiating at least a first target wake time (TWT) session between an access point and a first station, the first TWT session having a first set of parameters defining a wake time, wake duration, and wake interval for service periods of the first TWT session;
- selecting the first TWT session for health status determination;
- selecting a check window for the health status determination and monitoring transmissions from the first station within the check window;
- based at least in part on the monitoring of the transmissions from the first station, calculating a first TWT session health status value for the first TWT session; and
- determining whether corrective action is required for the first TWT session based at least in part on the first TWT session health status value.

18. The method of claim 17, wherein determining whether corrective action is required for the first TWT session includes:
- comparing the first TWT session health status value to a first threshold value; and
- upon determining that the first TWT session health status value does not meet the first threshold value, determining that the corrective action is needed.

19. The method of claim 18, further comprising:
- upon determining that the first TWT session health status value does not meet the first threshold value, adding the first TWT session to a count of TWT sessions with poor health;
- determining a proportion of a total number of TWT sessions for the access point are TWT sessions with poor health;
- comparing the proportion to a second threshold value; and
- upon determining that the proportion is above the second threshold, determining that corrective action is required for the TWT sessions of the access point.

20. The method of claim 17, wherein the first TWT session health status value is based on one or both of:
- a passive TWT session health determination including the access point to perform a sniffer operation at the access point to capture packets from the first station during one or more wake intervals for the first TWT session; and
- an active TWT session health determination including the access point to transmit a series of trigger frames from the access point to the first station during one or more service periods of the first TWT session and receive ACK frames at the access point from the first station in response to the series of trigger frames.

* * * * *